United States Patent
Savedra Pacheco

(10) Patent No.: US 10,202,962 B2
(45) Date of Patent: Feb. 12, 2019

(54) PSP BLADES WITH DIHEDRAL ANGLES, COMPRISING A LONGITUDINAL DEPRESSION

(71) Applicant: Pedro Savedra Pacheco, Lima (PE)

(72) Inventor: Pedro Savedra Pacheco, Lima (PE)

(73) Assignee: Pedro Savedra Pacheco, Lima (PE)

( * ) Notice: Subject to any disclaimer, the term of this patent is extended or adjusted under 35 U.S.C. 154(b) by 184 days.

(21) Appl. No.: 15/520,070

(22) PCT Filed: Oct. 20, 2015

(86) PCT No.: PCT/PE2015/000019
§ 371 (c)(1),
(2) Date: Sep. 18, 2017

(87) PCT Pub. No.: WO2016/068730
PCT Pub. Date: May 6, 2016

(65) Prior Publication Data
US 2018/0045175 A1    Feb. 15, 2018

(30) Foreign Application Priority Data
Oct. 20, 2014   (PE) .................... 001719-2014/DIN

(51) Int. Cl.
*F03D 1/06* (2006.01)
*F03D 7/02* (2006.01)

(52) U.S. Cl.
CPC ......... *F03D 1/0633* (2013.01); *F03D 7/0264* (2013.01); *F05B 2250/22* (2013.01); *F05B 2250/70* (2013.01); *Y02E 10/721* (2013.01); *Y02E 10/723* (2013.01)

(58) Field of Classification Search
CPC ........ F03D 1/06; F03D 1/0633; F03D 7/0264; F05B 2250/22; F05B 2250/70; Y02E 10/721; Y02E 10/723
See application file for complete search history.

(56) References Cited

U.S. PATENT DOCUMENTS

2011/0070094 A1   3/2011   Haddjeri
2012/0189455 A1   7/2012   Enevoldsen et al.

FOREIGN PATENT DOCUMENTS

WO    2005015009 A1    2/2005

*Primary Examiner* — Hieu T Vo
(74) *Attorney, Agent, or Firm* — Luoh J. Wu; Continent Patent Office LLP

(57) ABSTRACT

The invention relates to a novel rhomboidal wind turbine blade with a dihedral angle, as a supplement to another invention filed by the same applicant in 2013, said blade originally comprising four planar rhomboidal sides and a dihedral angle, and now including a longitudinal depression in the side forming the dihedral angle, from the center of the major axis of the blade, which traps more wind with a concave shape and directs same to the vertex of the angle, compressing the wind which rebounds from the vertex of the angle and powering the rotary movement with two sets of two blades per generator, as well as including an automatic safety system allowing the position of the blades to be changed in the event of high-speed winds by a computer system between a motor and a wind speed sensor, with the blades being coupled to the rotor with an angle that can be varied in response to high-speed winds.

4 Claims, 4 Drawing Sheets

PSP BLADES WITH DIHEDRAL ANGLES, COMPRISING A LONGITUDINAL DEPRESSION

INVENTION FIELD

The invention is related to wind electric power generation with horizontal axis rotary blades at 90° from the direction of wind movement on raised towers with high speed winds.

STATE OF THE TECHNIQUE

The state of the aerodynamic blades with dihedral angle technique up to now have only one worldwide precedent because this invention was not known before, which is a patent request presented by myself before INDECOPI in Peru on Jul. 16, 2013 currently in the international search phase by the PCT system that on February or March of 2015, the WIPO will be publishing the result passing to the national phase if it is viable to be patented country by country.

Said invention presents a new aerodynamic blade with a longitudinal volumetric rhomboid and smooth side in its four sides, with a dihedral angle lower than 45° in one of its longitudinal sides which captures one fourth of the fluid mass deviated by the frontal collision of the wind with said blade generating an effective rotating movement with only two blades over a horizontal axis at 90° of the lineal movement of the wind.

This state of art in the exclusive field of wind generators with dihedral angle blades is determined by the unique antecedent of the present invention to capture all the kinetic power of the wind, said invention has an very high capacity to produce electric power ever known to mankind, but at the same time it is still perfectible in the design and aerodynamic of said blade with a dihedral angle to reach maximum technical capacity to obtain potential wind power and convert it into a more efficient mechanical energy as well as to improve other elements of said invention as presented in this patent application.

SUMMARY OF THE INVENTION

The invention in addition to the foregoing consists of a modification of one of the four sides of the rhomboidal side of the blade, specifically the one that sides the dihedral angle which in the original one is plane and smooth, where the wind hits frontally it is divided in two masses, one that is embedded in the interior space of the dihedral angle and another one which is lost or redirection to the leakage space giving a lower thrust on the side with a dihedral angle.

The forming side of the modified dihedral angle, with a longitudinal depression from the center of the blade with an approximate depth of ¼ from the thickness of the lower axis of the blade, with a curved side, where the wind enters and is directly directed towards the interior vertex of the dihedral angle, compressing the one that bounces from the vertex without the possibility of returning as it seems to in the previous dihedral angle of the two sides which were simply planar. The longitudinal depression which produces a greater rotation and collection capacity of the kinetic power of the wind, in the same way as in the scale prototype tests have shown higher rotation speed and greater torque power in the horizontal axis of the system. The modified dihedral angle, with a longitudinal depression from the center of the blade with a depth of approximately ¼ of the thickness of the minor axis of the blade, with a curved shape, where the wind enters and is directed directly towards the Vertex interior of the dihedral angle, compressing the one that bounces from the vertex with no option of receding as it seems to happen in the previous dihedral angle of two simply flat sides. Longitudinal depression that produces greater capacity of rotation and capture of the kinetic power of the wind, as well as in tests with prototype to scale to demonstrated greater speed of rotation and greater torsion force in the horizontal axis of the system.

DESCRIPTIVE MEMORY OF THE INVENTION

Figure 1:
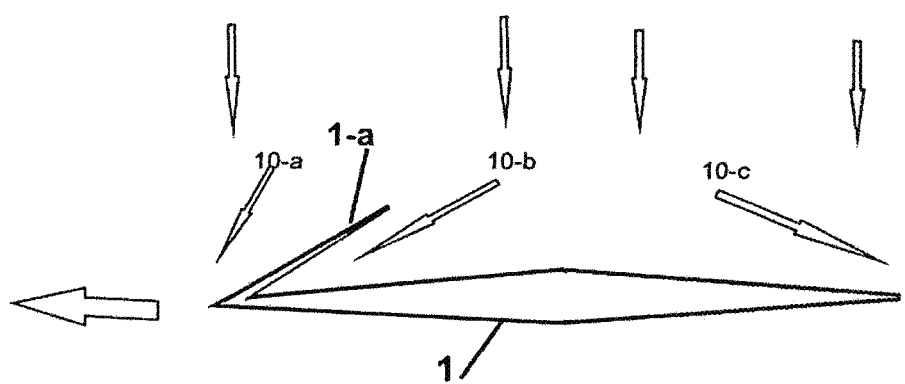
FIG. 1 shows PSP Aerodynamic blade with a dihedral angle in patent application.

The new wind generator with PSP dihedral angle blades No. 2, whose only precedent has been mentioned in the state of art contains all the elements and basis of said invention in the patent application, which in the process of research with a prototype test has allowed us to perfect it by adding new properties and forms of design and construction of the blade with dihedral angles for the purpose of comparison attached is FIG. 1, corresponding to the first invention, which presents a cross section of said blade 1 of an elongate rhomboidal shape, in a frontal position to the wind 10 when it colliding with both sides of the blade it is divided into two masses over its planar and smooth surface, where the mass of wind 10-b is directed to the left, impacting with the Inner side of the dihedral angle formed by the blade 1-a generating rotary movement of the blade in the direction of the arrow without number of the left, where in turn the outer vertex of said blade dihedral angle cuts the wind, crossing it without scattering it nor altering its linear movement towards the other side of the rotation space of the blades, which will be used for new properties of the system, while in the Figures you may also notice how the wind 10-a and 10-c slide freely.

Figure 2:
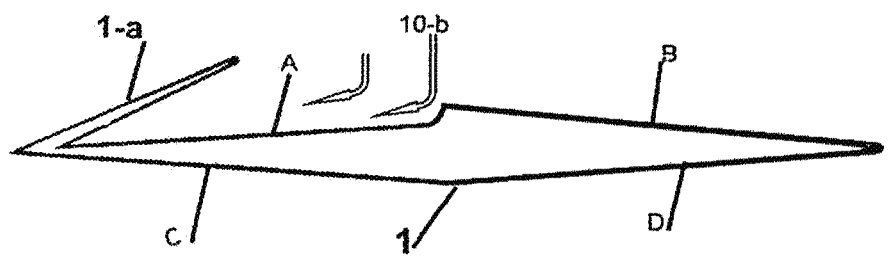
FIG. 2 shows new PSP blade with dihedral angles with a longitudinal depression in the forming side of the dihedral angle to collect greater kinetic power.

The further aspect of the patent application is shown in FIG. 2, where one of the four rhomboid sides of the blade, the side A forming the dihedral angle 1-a has been modified by presenting a depression from its continuous flat surface to a deeper one with splicing with the minor axis of the concave blade, where the wind 10-b impacts with said hollow space and it slides following the shape of the blade by rotating counter-clockwise against the dihedral angle dominating the mass of the wind that bouncing in said angle may take away the thrust power, while the B,C, and D sides maintain the original shape of the preceding invention.

Personal laboratory tests with the installation of two sets of blades, one in the front section of the gondola and another in the rear section showed that: the rear set with blades having a frontal depression rotated faster than the front blades with equal planar sides in the original invention despite apparently receiving a directional impulse from kinetic power of weakened wind.

Figure 3:
FIG. 3 shows depth ratio between the depression and thickness of the blade.

The ratio or relationship between the uniform geometry of the four-sided blade to the depth of the depression applied to said blade is equal to approximately ¼ of the thickness or dimension of the minor axis of the dihedral angle blade shown in FIG. 3, where it shows a perpendicular cut of said blade, the average thickness thereof with the dimensions 11, 12 and 13 where the thickness between 12 and 13 is approximately equal to a quarter of the thickness of said blade.

Figure 4:
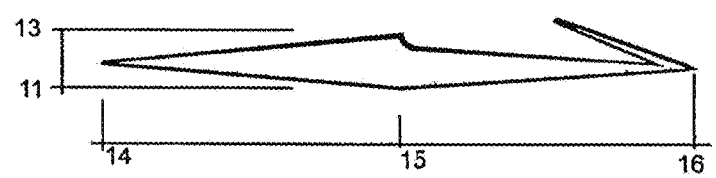
FIG. 4 shows relationship between the total width of the blade and its average thickness.

FIG. 4 shows the relationship between the total width of the blade equal to the distance between the vertices 14 and 16 and the distance or thickness of the blade between 11 and 13 equal to ⅕ of the distance between the vertex 14 and the center 15, which are basically measures and not absolute and referential proportions to be determined if they are required in the future patent research.

Figure 5:
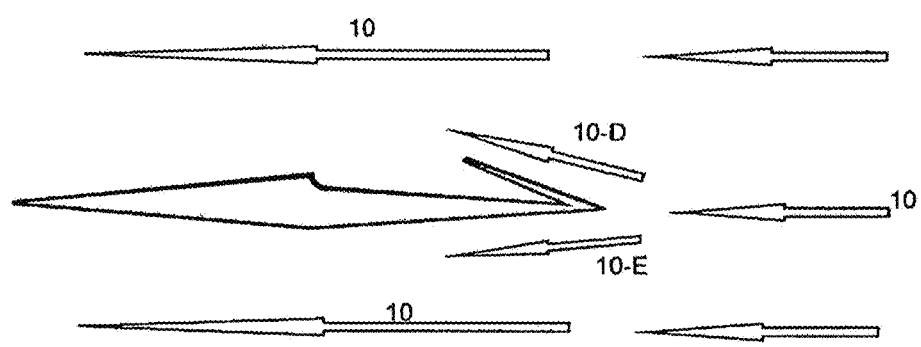
FIG. 5 shows the position of the blade with a dihedral angle and the wind direction in case of high speed winds or storm.

As a wind generator must ensure its resistance to the destructive action of high-speed winds greater than its maximum wind speed range to work without risk of destruction. In the personal lab tests, it was proven to rotate both blades at 90° from its working position to align its greater side with said wind as shown in FIG. 5, where the wind 10 collides with the exterior vertex of the dihedral angle of the blade 1 and is divided in two masses 10-D and 10-E immobilizing the rotary movement of said blades through the free passage of the wind accelerated by the hurricane or storm effect.

Figures 6, 7:
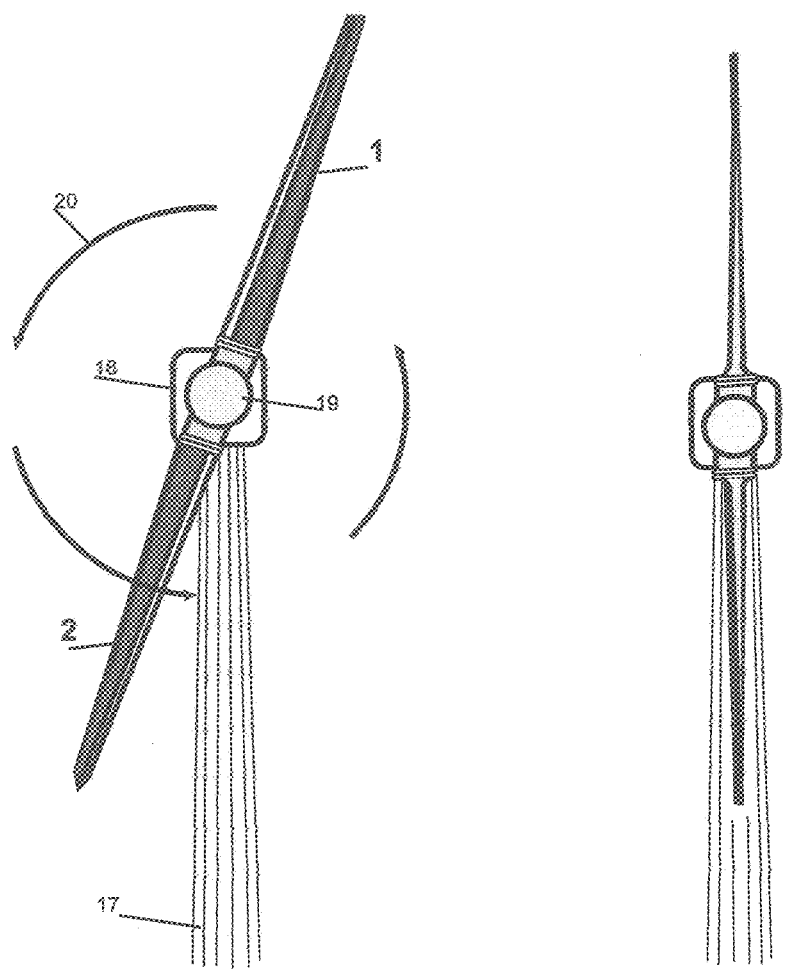
FIG. 6 shows the front view of the dihedral angle blades with safe working winds.
FIG. 7 shows the front view of the blades at a 90° from the working position or parallel to the wind blowing direction, immobilized without rotation.

The same is shown in FIG. 6 of the elevation of the wind generation over a tower 17 in front of the nacelle 18 and at both sides of the rotor 19 while blades 1 and 2 are rotating according to the rotation arrows 20 which indicate the rotating movement in counterclockwise direction determined by the position of the dihedral angle in one of the sides of the moving blades.

FIG. 7 shows the blades 1 and 2 in a vertical static position seen from its edge of the major side with dihedral angle, moved to that position automatically by the action of a sensor, a motor and a computerized system standard on the market, blades that past the danger will return to their production position.

Figure 8:
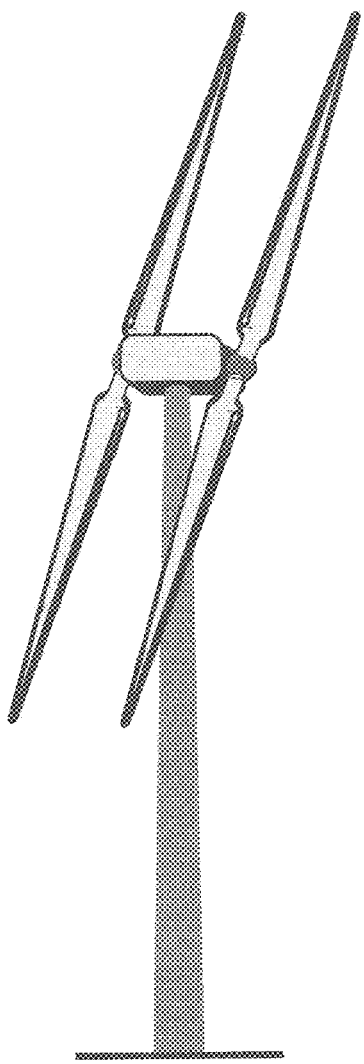
FIG. 8 shows the elevation of the whole system or wind generator with blades of dihedral angle and a connection system with the gondola or room of electrical generation.

Finally FIG. 8 only as a reference shows the wind generator with blades with dihedral angles with a longitudinal depression with two sets of blades, one in the frontal part against the wind and another set in the back, turning both with only one wind mass doubling its wind power production capacity.

Finally, FIG. 8 only shows the wind generator with dihedral angle blades with longitudinal depression with two sets of blades, one in the front against the wind and the other in the back, both turning one Mass of wind, doubling its capacity of electric wind production.

The invention claimed is:

1. PSP blades with dihedral angles with a longitudinal depression comprise: a longitudinal depression in the forming side of the dihedral angle of the rhomboidal blades, wherein said side to the major theoretical axis with an initial concave shape approximately equal to its minor axis or ¼ of thickness continuing with a planar shape until the dihedral angle vertex, depression collects greater wind pressure force directing it towards the vertex stopping the wind that bounces, and increasing the rotation speed of the set of blades, greater speed and power which increases the torsion force of the horizontal axis of the wind generator, which in turn increases its renewable power production; which likewise comprises ratios between the axis or rhomboidal diameters of the blades; procedure to immobilize the rotary movement of the blades in case wind speed is higher than its working range and connects the variable angle blades with the rotor system.

2. PSP blades with dihedral angles with longitudinal depression according to claim 1, wherein the proportions between thickness or minor axis of a blade with a dihedral angle and the width of the major axis along the whole length of the blade equal to ⅕ of the half or 1/10.

3. PSP blades with dihedral angles with longitudinal depression according to claim 1, wherein comprises the automatic stopping of the rotational movement of the blades in high speed winds by the rotation of the blades at 90° from their working position by aligning their greater width with the wind due to the effect of digitalis anemometer, computer and gearbox on the market, that after the danger return the blades to 90° of the wind.

4. PSP blades with dihedral angles with longitudinal depression according to claim 1, wherein comprises the coupling or splice of the blades with the rotor system characterized by: a radial splice with the rotor capable of circular movement up to 90° from its working position in such a way that each blade change from its frontal position against the wind to capture its kinetic power to a parallel position to avoid being in cases of high speed winds that endanger the whole system or wind generator.

* * * * *